United States Patent [19]
Goodman

[11] Patent Number: 5,959,702
[45] Date of Patent: Sep. 28, 1999

[54] LENSLESS VIDEO PROJECTOR

[76] Inventor: John Mott Goodman, 9472 Central Ave., Garden Grove, Calif. 92844-1505

[21] Appl. No.: 08/727,850

[22] Filed: Oct. 4, 1996

[51] Int. Cl.⁶ ........................................................ H04N 9/31
[52] U.S. Cl. ........................... 348/744; 348/750; 348/752; 348/754
[58] Field of Search .................................. 348/197, 198, 348/199, 201, 203, 205, 744, 750, 754, 756, 757, 764, 769, 770, 773; 359/305, 306, 307, 308, 309, 310, 311, 312, 313

[56] References Cited

U.S. PATENT DOCUMENTS

| | | | |
|---|---|---|---|
| Re. 29,670 | 6/1978 | Spaulding | 386/42 |
| 3,383,460 | 5/1968 | Pritchard | 348/752 |
| 3,436,546 | 4/1969 | Derderian | 359/202 |
| 3,507,984 | 4/1970 | Stavis | 348/757 |
| 3,514,534 | 5/1970 | Korpel | 348/198 |
| 3,597,536 | 8/1971 | Fowler | 348/198 |
| 3,710,015 | 1/1973 | Fowler | 348/758 |
| 3,758,195 | 9/1973 | Hedman, Jr. et al. | 349/33 |
| 3,783,185 | 1/1974 | Spaulding | 386/42 |
| 3,869,197 | 3/1975 | Owens et al. | 359/311 |
| 3,882,273 | 5/1975 | Knox | 348/198 |
| 3,917,380 | 11/1975 | Kato et al. | 359/35 |
| 4,054,361 | 10/1977 | Noguchi | 359/218 |
| 4,297,723 | 10/1981 | Whitby | 348/36 |
| 4,371,964 | 2/1983 | Podmaniczky et al. | 372/38 |
| 4,614,408 | 9/1986 | Mir et al. | 359/250 |
| 4,835,601 | 5/1989 | Kobayashi | 348/196 |
| 5,144,337 | 9/1992 | Imamura et al. | 347/252 |
| 5,148,285 | 9/1992 | Nakame et al. | 348/196 |
| 5,173,958 | 12/1992 | Folsom et al. | 385/36 |
| 5,255,082 | 10/1993 | Tamada | 348/750 |
| 5,317,162 | 5/1994 | Pinsky et al. | 250/461 |
| 5,703,702 | 12/1997 | Crane et al. | 359/1 |
| 5,844,716 | 12/1998 | Anderson | 359/462 |

OTHER PUBLICATIONS

Hoya Corporation, Large–Screen Projection Television—Scans Screen Sections With Video Image Light Beams From Acousto–Optic Modulators To Which Partioned Signals Are Input, Search Entry Document Only, JP 03284078 A, Dec. 1991.

*Primary Examiner*—Tommy P. Chin
*Assistant Examiner*—Dinh Cao Peter Chu
*Attorney, Agent, or Firm*—Herbert M. Shapiro

[57] ABSTRACT

A video projector employs an acousto-optic deflector for moving a horizontal line of pixels vertically to form an image on a remote screen. Because the pixel images are formed from parallel beams, rather than by reimaging a line of pixel images on a vertical deflector, the image formed is in focus at all screen distances. The horizontal line of pixels is formed from a single laser beam which is expanded laterally and passes through individual intensity modulators before being aimed at the vertical deflector. The horizontal line of beams may be divided into zones, one above the other, and later reorganized into a single line at the vertical deflector, in order to reduce the size of the projector.

20 Claims, 14 Drawing Sheets

Move aperature plates vertically and stop on detents to align holes with zone bundles.

LENSLESS VIDEO PROJECTOR

FIELD OF THE INVENTION

This invention relates to video projectors and more particularly to apparatus for forming a real time video image on a screen using a modulated laser beam.

BACKGROUND OF THE INVENTION

The formation of video images on a screen by the movement of a modulated laser beam in both an x and y direction is analogous to image formation by electron beam deflection in a cathode ray tube (CRT). It is also known to use a lens with such a CRT system to project an image on a distant screen.

The use of acousto-optic deflectors and modulators for video image projection has also been proposed as shown, for example, in U.S. Pat. No. 4,720,747 and in J. M. Rouvan et al. "Theoretical study of the acousto-optic diffraction of light waves by acoustic waves in Lithium Niobate Crystals," Applied Optics, Vol. 29, No. 9, pp. 312–1316, March 1990. Common to all previously disclosed display devices employing acoustic waves is that they form a line of pixel images inside the deflection cell and then focus that line on a distant screen. The acoustic deflection in those devices was limited to sweeping the line of pixels vertically on the screen. This was necessary because it is not possible to sweep a single-pixel beam in both x and y directions rapidly enough to form a full, flicker-free image.

The reason that this is so, is that in order to change the angle of acousto-optic deflection, one must replace the acoustic wave of one wave-length with another of a different wave-length throughout the deflection cell. This cannot be done in less time than it takes for the acoustic wave to travel across the cell, and that sets a minimum time for changing the deflection angle. The limit so set is not sufficiently small to accommodate the needs of both horizontal and vertical deflection in a standard, two-dimensional raster-scan display. It is, however, adequately small to accommodate the scanning in just the vertical direction.

In either embodiment, a key feature is that the image is formed in focus at all screen distances simultaneously. Thus no focusing lens is needed to create a sharp image, and arbitrarily non-flat screen surfaces may be used.

BRIEF DESCRIPTION OF THE INVENTION

In accordance with the principles of this invention a lensless video projector employs only a vertical deflector, rather than both a horizontal and a vertical deflector, for forming an image on a screen. But the input to the vertical deflector is formed in a unique way: Specifically, a coherent beam of light, conveniently from a laser, is directed at a beam expander which spreads the beam horizontally to illuminate in succession: (1) a collimator; (2) an aperture plate which defines the diameters of multiple pixel beams; (3) an array of beam intensity modulators to vary the beam intensities in accordance with the video input signals; and, (4) an array of prisms which direct the pixel beams to the vertical deflector (array). Importantly, the horizontal expander diverges the beam from a single input (the laser) into a plurality of individual pixel beams which are initially all parallel to one another.

The aperture plate defines the beam diameter and for an N aperture plate, N beams, with now defined diameters, are directed at associated signal responsive intensity modulators. The modulated beams pass through prisms which aim the beams properly with respect to the vertical deflector for forming a succession of vertically-spaced line images on a screen for producing a video image thereon. The vertical deflector can be any such deflector such as an acousto-optic deflector or an oscillating mirror.

In one embodiment, the pixel beams are initially arranged side-by-side, then angled through the vertical deflector onto the screen. In this fashion they all appear to diverge from a single point source.

In a second embodiment, the pixel beams ire grouped into zones. In each zone, the pixel beams and arranged side-by-side as in the previous embodiment. The beams of one zone are placed above those of the adjacent zone. Prisms direct all the beams to the vertical deflector, and secondary prisms redirect the zone beam bundles to align all the pixel beams as before.

DETAILED DESCRIPTION OF ILLUSTRATIVE EMBODIMENTS OF THIS INVENTION

Figure 1:
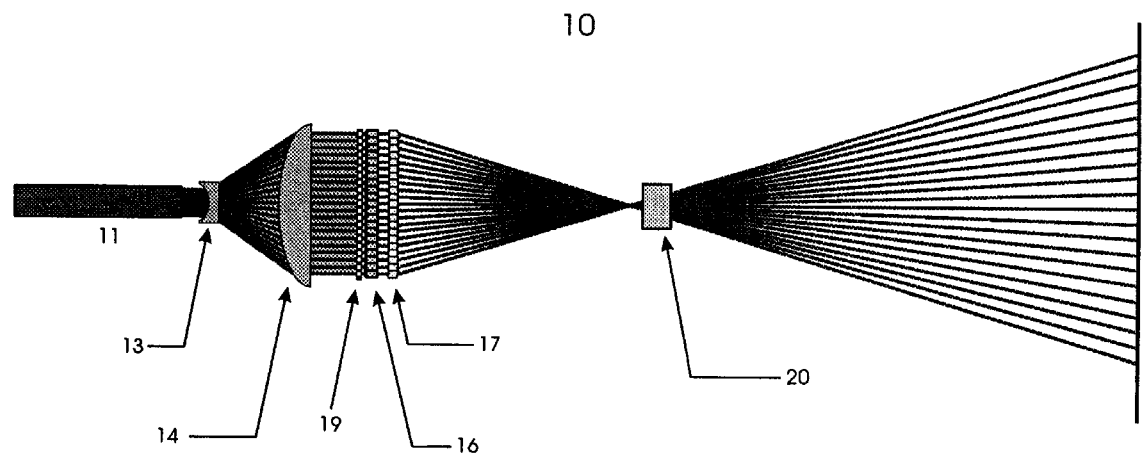
FIGS. 1 and 2 are schematic top and side views of a projection system in accordance with the principles of this invention.

FIG. 1 shows a projection system 10 in accordance with the principles of this invention. The system includes a laser light source 11 and beam expander 13 which expands the beam horizontally, as viewed in the top view of FIG. 1 into a plurality of parallel beams. These beams are made parallel with respect to one another by a collimator 14. The now parallel beams are directed through respective beam intensity modulators (16) which may comprise Kerr cells. The outputs of the Kerr cells (now modulated) are directed into a segmented prism 17. The system advantageously includes an aperture plate 19 for defining beam diameter as is discussed more fully hereinafter.

The individually modulated outputs of segmented prism 17 form all the pixels of a single horizontal line of the video image. Consecutive lines of a video image are defined by the inputs to intensity modulators 16 as is also discussed more fully hereinafter. These consecutive line images are directed at vertical deflection/diffraction cell 20 which deflects the successive line images in a vertical direction which is into and out of the page as viewed in FIG. 1.

Figure 2:
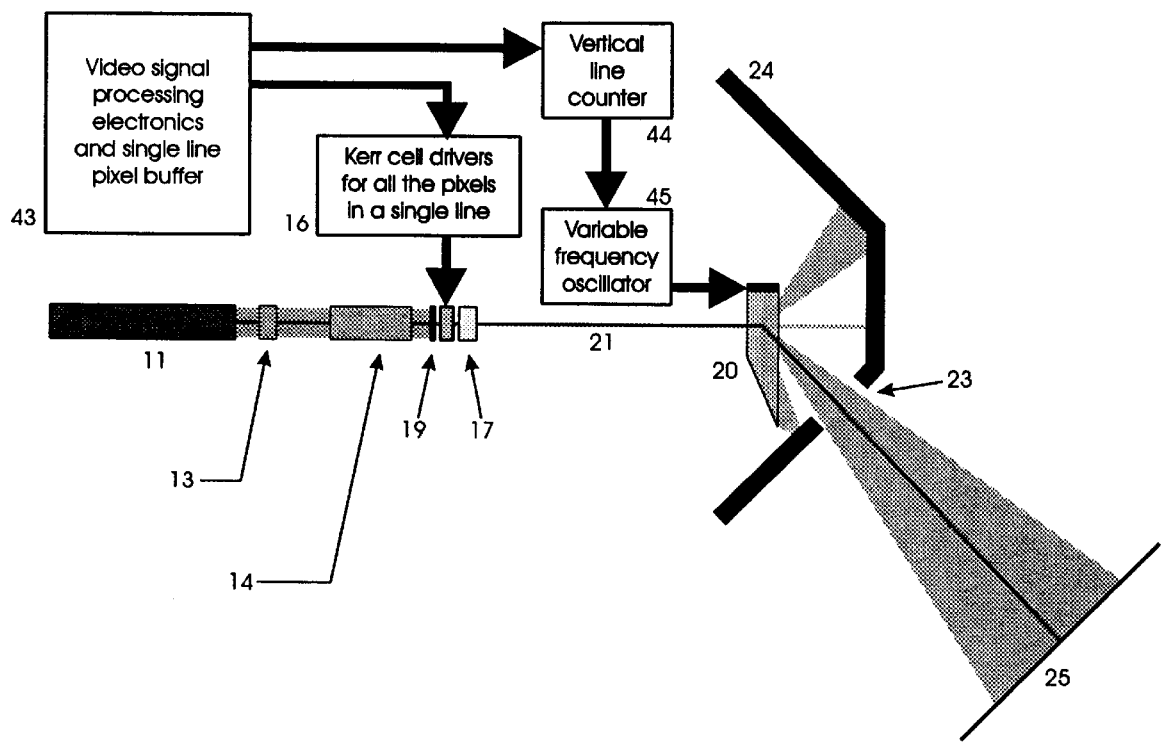
Figure 3:
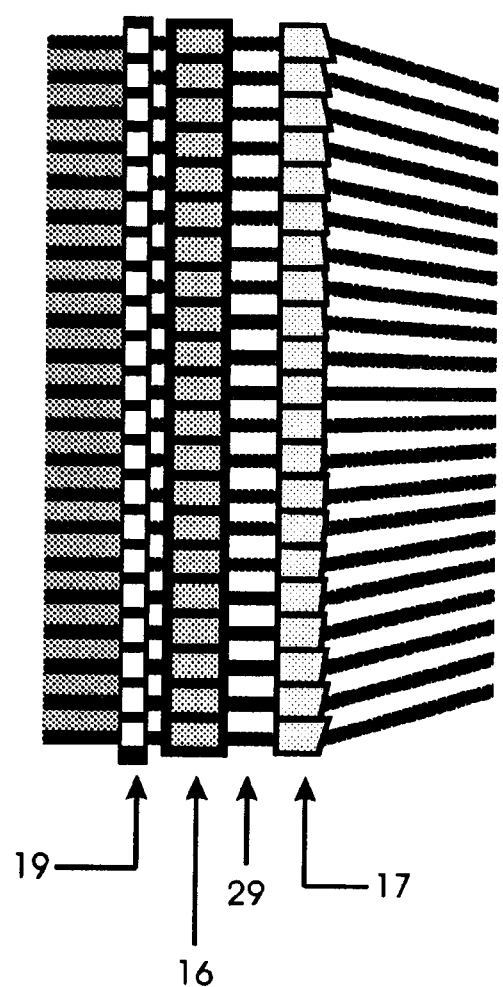
FIGS. 3 and 4 are enlarged views of portions of the system of FIGS. 1 and 2.

FIG. 2 shows a schematic side view of the system of FIG. 1. The vertical deflection/diffraction cell 20 can be seen to deflect the successive horizontal lines of the image through an aperture 23 in a shield 24 to projection screen 25. Specifically, beam, from collimator 14 of FIGS. 1 and 3, is directed through aperture plate 19, and individually modulated by intensity modulators 16 forming separate and individually and simultaneously modulated beams 29 representing a line (29) of a video image. The line is properly aimed at vertical deflector 20 by segmented prism beam deflector 17.

Figure 4:
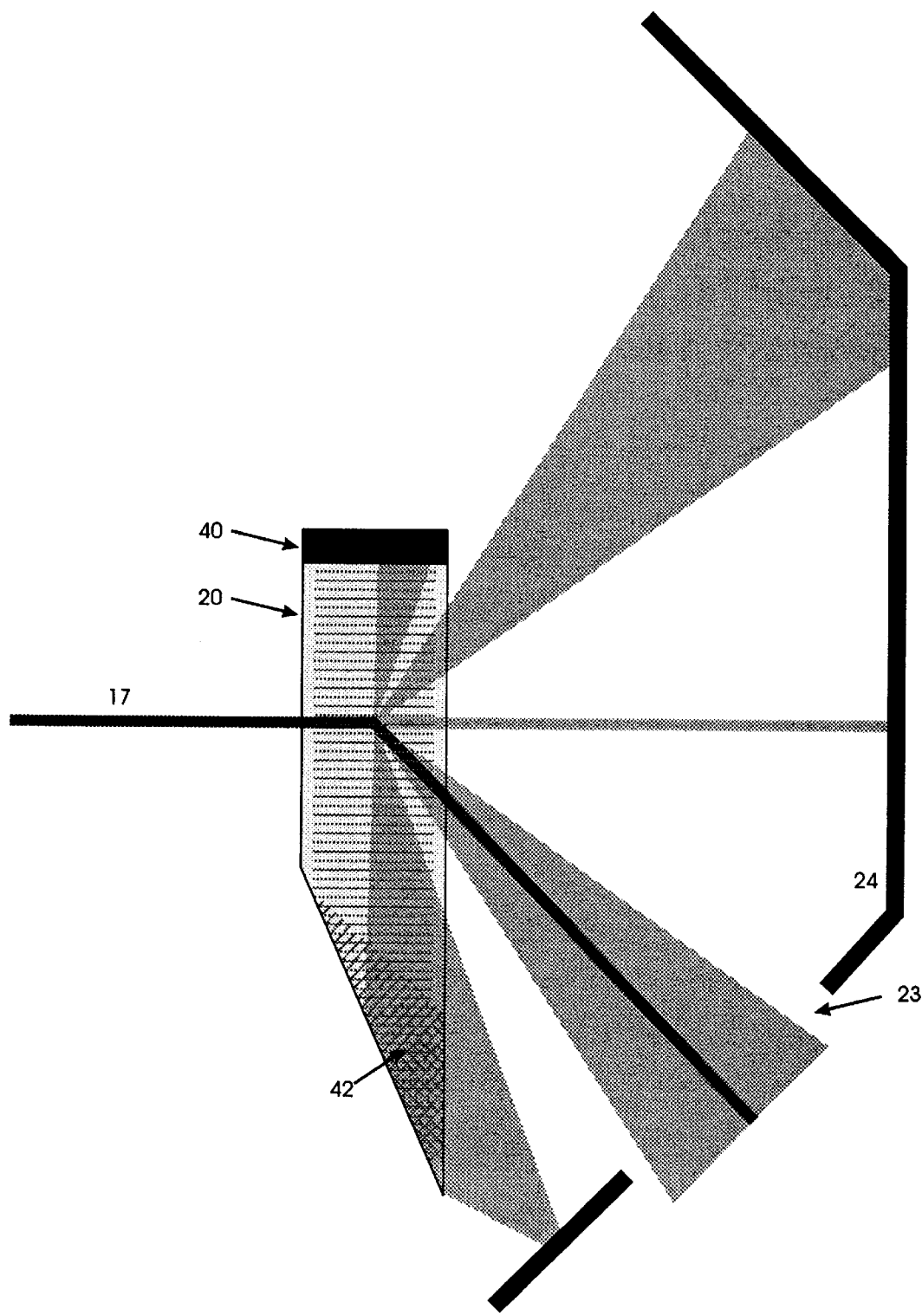

FIG. 4 illustrates the operation and structure of the vertical deflector of the system in FIGS. 1 and 2. The deflector comprises a hollow glass enclosure which is flat at a first end 40 and flat or wedge-shaped at a second end 42. The enclosure includes illustratively carbon tetrachloride (an acousto-optic liquid) and has a piezoelectric (illustratively quartz) crystal communicating with flat end 40. The piezoelectric crystal is connected to a radio frequency oscillator which applies an alternating voltage to the crystal causing the crystal to contract and expand in synchronism with the voltage. The mechanical motion of the crystal sets up an acoustic wave which travels in the fluid inside the enclosure. The acoustic wave forms a diffraction grating which causes vertical deflection of the line of video pixel beams.

FIG. 2 represents the video signal processing electronics including a single line pixel buffer as box 43, outputs from which are connected to inputs to vertical line counter 44. The output of counter 44 is connected to the input of variable frequency oscillator 45. Outputs from processing electronics 43, representing intensity signals, are applied to inputs to intensity modulators 16 for all the pixels in a single line. The outputs of processing electronics 43 which are connected to vertical line counter 44 carry the vertical and horizontal sync signals.

Figure 5:
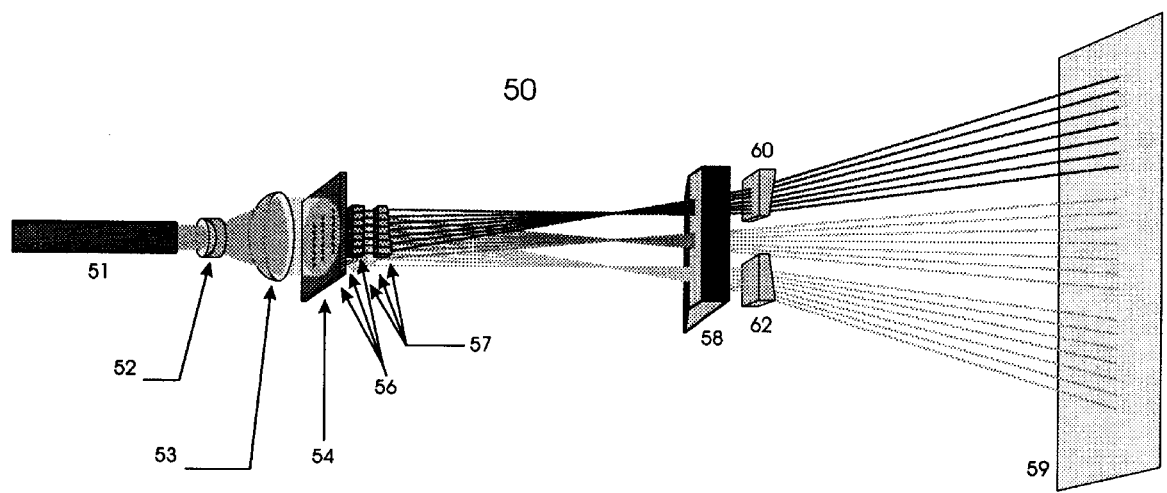
FIG. 5. is a top view of an alternative projection system in accordance with the principles of this invention.

FIG. 5 shows an alternative projection system 50 in accordance with the principles of this invention. In the system of FIG. 5, the pixels in any one row of pixels are divided into zones. This division is accomplished by arranging the intensity modulators and their associated prisms for each zone in a layer with the separate zone layers arranged above and below each other. The segmented prisms for each zone are tilted to direct the bundle of pixel rays to a different region of the vertical deflector. A final prism for each zone, after the vertical deflection cell, aligns the beams vertically and directs them to the proper position on the screen horizontally.

With specific reference to FIG. 5, a laser 51 directs a beam of light at beam expander 52 and through a collimator 53. The collimated beam passes through an aperture plate 54 shown enlarged in FIG. 6. Note that the beam expander and the collimator spread the laser beam in the vertical as well as the horizontal direction in this embodiment.

The beams exiting the aperture plate are modulated by intensity modulators (e.g., Kerr Cells) 56, each zone layer of pixel beams being aimed at a different region of vertical deflection/diffraction cell 58. The illustration of FIG. 5 is for three layers or zones for each line of pixels in a video image as is clear from the figure. Cell 58 uses acoustic waves to create a diffraction grating that deflects the pixel beams to the correct row on the screen 59. The system of FIG. 5 employs a prism for each zone between cell 58 and screen 59, only two (60 and 62) being shown in the figure. Each such prism aims the zone bundle of pixel rays at the center of that zone's section of the scan line and tips the zone vertically to align all the zones on the same line.

The arrangements into zones of the pixels in a scan line of a video image permits the horizontal dimension of the intensity modulators of FIGS. 1 and 2 to fall into a relatively practical range. In the arrangement of FIGS. 1 and 2, for example, the array of intensity modulators, each two millimeters square in cross section, would measure about 1.3 meters by two millimeters. By dividing a scan line into zones as illustrated in FIG. 5, the array of intensity modulator is about six hundredths of a meter on a side.

Figure 7:
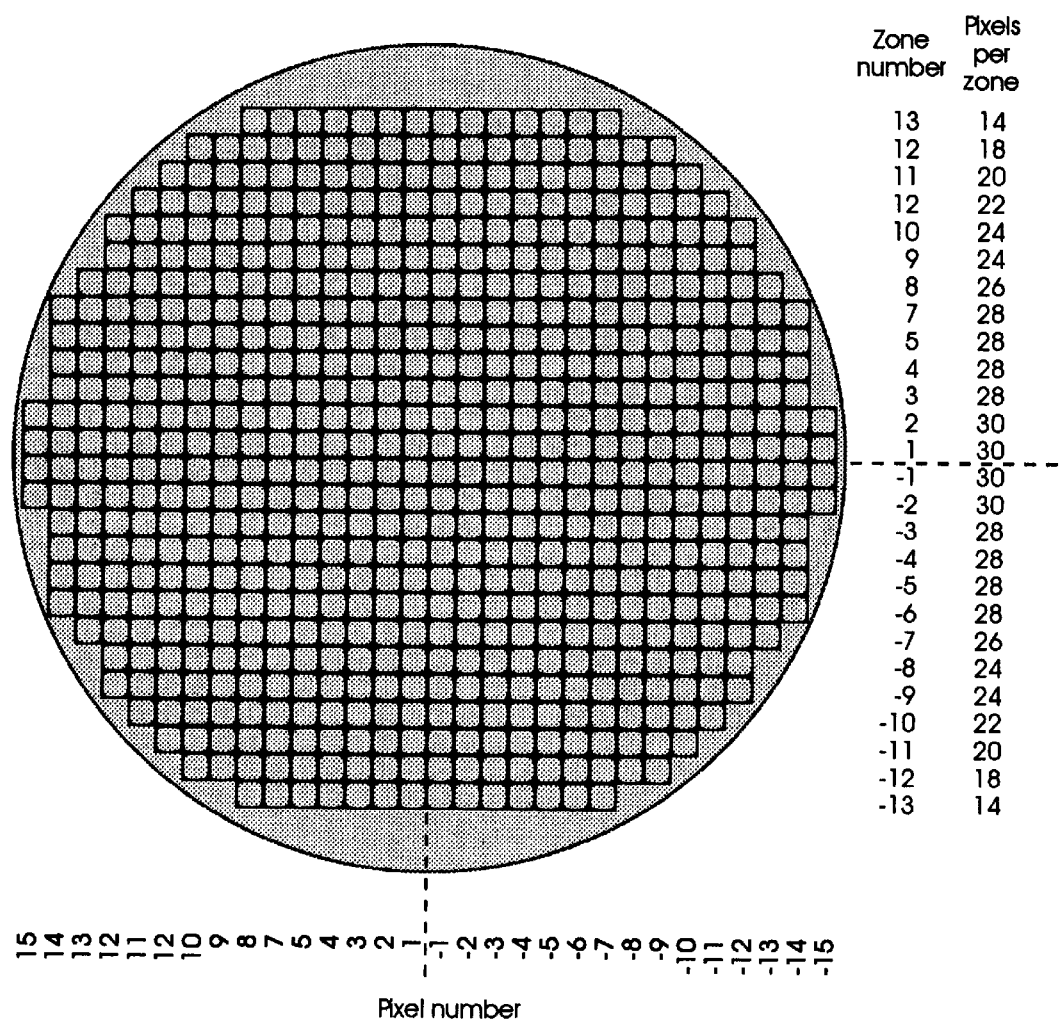
FIG. 7 is an enlarged schematic view of an illustrative pixel arrangement for the embodiment of FIG. 5.

A practical example of the division of pixels into zones is illustrated in connection with FIG. 7. We will assume that we have a projector which produces six hundred and forty pixels per scan line. FIG. 7 shows one way the pixels might be divided into zones. The figure shows a grid with twenty six zones with from fourteen to thirty pixels per zone. The vertical axis to the right of the grid, as viewed shows two columns; one for the zone number, one for the number of pixels per zone. The numbering scheme designates zones starting at the center of the grid. No "zero" designation is shown because of the even number of zones shown in this illustration. The array of intensity modulators (again each with a two millimeter cross section) for the zone arrangement of FIG. 7 can be illuminated by a beam just over 0.06 meters in diameter.

The arrangement of zones as shown in FIG. 7 results in the bundle of beams for all six hundred and forty pixels spans an angle of forty degrees. This means that the zones have angular sizes ranging from 0.70 degrees to 1.20 degrees and the pixel beams arrive at the vertical deflector going in essentially the same direction.

Figure 6:
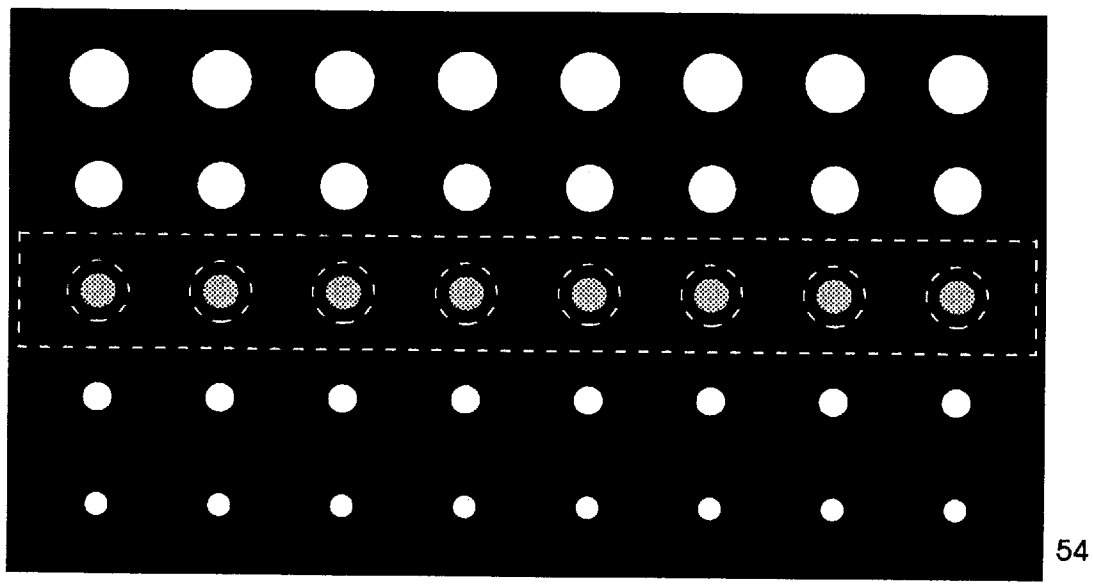
FIGS. 6 and 8 are front views of aperture plates for the embodiments of FIGS. 1 and 5.

The spot diameter and the screen 25 is set by the size of the initial pixel beams. It cannot be smaller than those beams and it will be larger by the diffraction spreading of those beams. To get an optimum (minimum) size pixel spot, one may adjust the beam diameters to an appropriate value for the approximate screen distance being used. In the arrangement of FIG. 6, for example, the beam diameter-defining plate can be moved vertically to align a different row of apertures with the zone bundles. Within each row, all the holes are the same size; from row to row, the aperture size is different.

Figure 8:
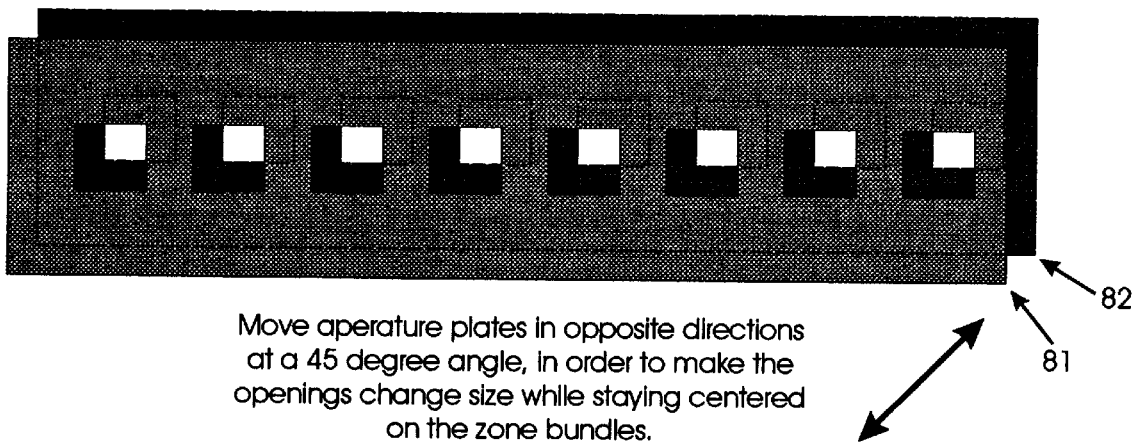

FIG. 8 illustrates an alternative technique for adjusting aperture diameter. The figure shows an aperture plate assembly 80 comprising first and second aperture plates 81 and 82 each with a row of square holes. The plates are movable along a forty-five degree diagonal in order to make the openings change size while staying centered on the bundle of beams in a zone. This arrangement permits the effective size of the holes to be adjusted smoothly from the maximum size down to zero to accommodate various screen distances.

For systems employing zones as shown in FIG. 5, where the intensity modulators are precisely manufactured, the aperture plate can, alternatively be located just in front of or immediately behind the vertical deflector and the aperture plate need only have one hole per zone instead, of one hole per beam.

Figure 9:
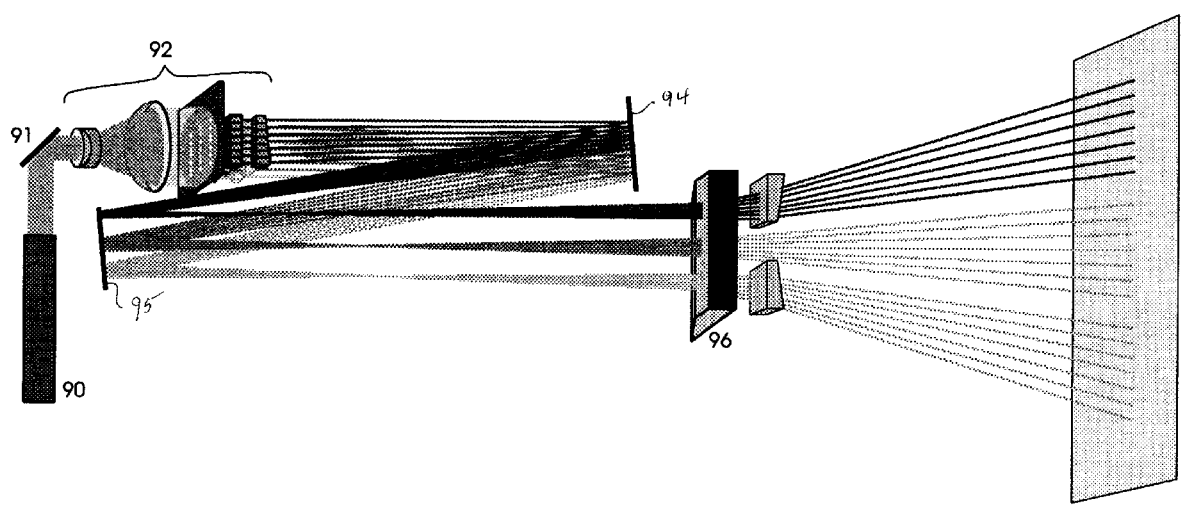
FIG. 9 is a schematic top view of a third embodiment in accordance with the principle of this invention.

Even for the embodiment of FIG. 5, the projector is fairly large requiring a separation of the vertical deflector and the location of the intensity modulators and prisms of over three and one-half meters. But this distance is reduced by folding the beams from the stack of zone-defining prisms back and forth between a pair of (front surface) mirrors before they converge on the vertical deflector. FIG. 9 illustrates an arrangement using two mirrors and three zones. In a practical arrangement many reflections would be used as well as many more zones. The idea is to change the volume encompassed by the beams from a narrow rectangle prism of, for example, 0.056 meters wide and high by 3.6 meters long to a volume with a more nearly spherical (or cubical) shape. By using eight reflections in the mirrors, rather than the two illustrated, the beam paths will be confined within an approximately one-fifth meter cube.

If a circular cross section laser beam is used, the number of zones and the number of pixels per zone are chosen to be about equal to one another in contradistinction to the arrangement illustrated in FIG. 7. If the number of zones and the number of pixels in a zone are about equal, the zone bundle ends up about twice as wide as the array of intensity modulators unless the intensity modulators have an appreciably greater height than width. If the modulators are about twice as high as they are wide, the optimum number of pixels per zone is about double the number of zones. In that case, the overall width of the bundle of zones stays approximately constant all the way from the intensity modulation cells to the vertical deflectors.

The bundle of zones has a height equal to that of the intensity modulators which is comparable to the width of a zone. But, by the time the bundle arrives at the vertical deflector, it will have a height of no more that about twice that of the initial pixel beam diameter.

In FIG. 9, a laser source 90 directs a beam at mirror 91 through the zone defining subsystem 92 back and forth between mirrors 94 and 95 to the vertical deflector 96. But the beams can be folded up and down as well as back and forth (as illustrated). This would permit an even smaller projector size to be realized. For the illustrative 640 pixel projector a projector of twenty centimeters on a side could be achieved using such a three dimensional folding of the light path.

Figure 10:
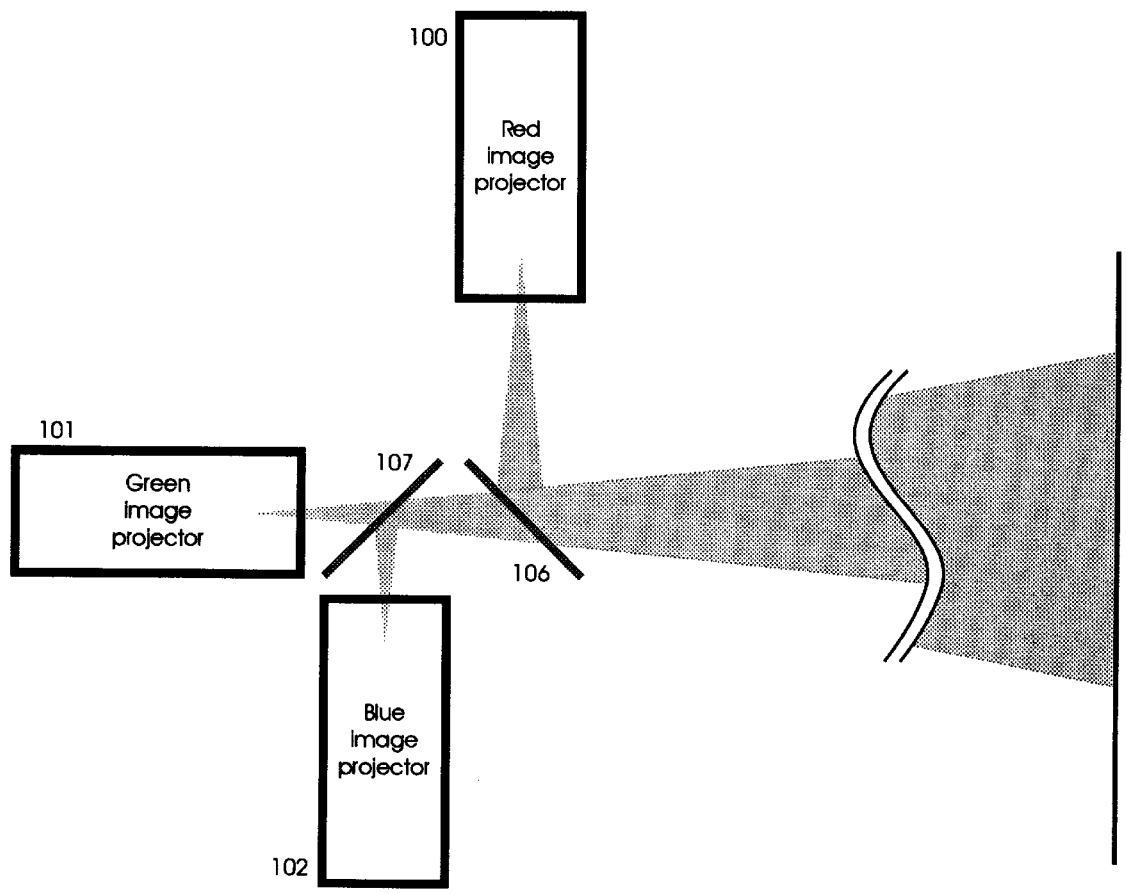
FIG. 10 is a schematic top view of a three color projection system in accordance with the principles of this invention.

Full color images can be created in the manner used in normal color television and computer monitors by superimposing three monochromatic images: red, green, and blue. FIG. 10 shows red, green, and blue image projectors 100, 101, and 102, each arranged the same distance from screen 104 using dichroic mirrors 106 and 107 as shown to combine the beams with minimal energy loss. Ideally, the individual projectors have beam sizes that are different approximately in proportion to the different wave lengths of light that they are projecting. This will make the beam divergence of all the different pixel beams of all the colors comparable. Thus, at any screen distance the pixels can be made to fall in alignment and be of the same size for all three color images.

Figure 11:
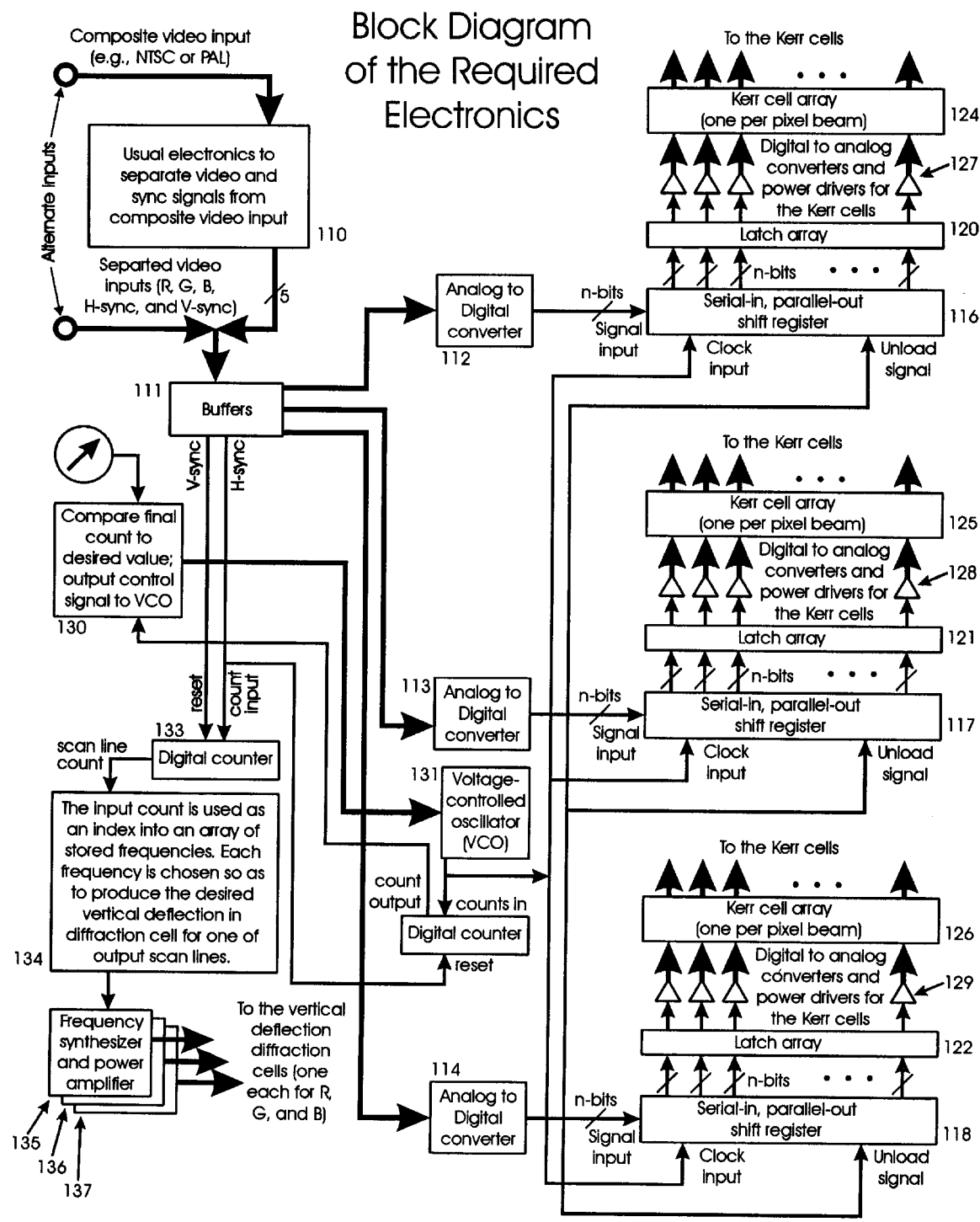
FIG. 11 is a block diagram of the electronics for a three color projection system using the system of FIGS. 1, 5 or 9 and 10.

FIG. 11 is a block diagram of the electronics employed for a three-color version of a lensless video projector. Block 110 of FIG. 11 represents standard electronics (analog) which separates R, G, B color signals and the (horizontal) H, and (vertical) V sync signals from a composite (illustratively NTSC, PAS, or SECAM) input. The signal outputs from block 110 are buffered in buffer 111 and the R, G, B brightness signals are sampled and corrected to digital values by analog-to-digital converters 112, 113, and 114 on a pixel-by-pixel basis. The pixel values are then clocked into shift registers 116, 117, and 118. The H sync signal starts, the process and resets it at the end of each scan line. The H sync signal also is used to parallel unload the shift registers into an array of latches 120, 121, and 122 which drive digital to analog converters 124, 125, and 126 and power amplifiers (127, 128, and 129) to control the intensity modulators (i.e. Kerr Cells).

The clock for loading the pixels is generated locally and is adjusted to an appropriate value. This is clone by counting the pixel loading pulse and by noting the final count when the next H sync pulse arrives as indicated by block 130, the output of which is connected to the input to block 131 representing the voltage-controlled oscillators (the clock).

The H sync pulses also are accumulated in a scan line counter 133. This count signals which line of the image is being displayed. The digit count is used to index into an array in a non-volatile memory that holds the correct frequency values for each vertical scan line, for each of the three colors, at the resolution currently being displayed. The frequencies are not linearly related to the line count, but instead are chosen to make the sweeps angles linear in line count. Each frequency is chosen to produce the desired vertical deflection in the vertical deflector for one of the output scan lines. Block 134 represents the non-volatile memory.

The values retrieved from the foregoing array are sent to an array of three frequency synthesizers 135, 136, and 137. The outputs from those synthesizers drive power amplifiers that drive the crystals on the vertical deflector which in turn generate the acoustic waves. Those waves, in turn, make up the effective diffraction gratings that deflect the beams in the vertical direction.

Each vertical sync pulse resets the scan line counter. The number of H sync pulses which occur per V sync period tells the projector what the vertical resolution of the current image is. From a table of stored resolution values, the projector can get the corresponding horizontal resolution and load the memory with the correct frequency value for the vertical scan and adjust the pixel clock rate appropriately.

A pair of switches (not shown) would allow the inverting of the final image vertically or horizontally to permit the use of the projector in rear or front projection situations as well as the folding of the output beam in one or more mirrors to get a larger projector-to-screen distance in a confined space.

To obtain an image with equally spaced pixels, the angles between adjacent pixels must be the same all across the scan line. This means that the sideways deflection of the pixel beams in all zones can be accomplished by a common set of pixel prisms. This set of prisms can be fused into one faceted block of plastic where for example all facets are formed on the output side of the prism facing the vertical deflector and where the facets are vertical stripes so that corresponding pixels in each zone get equal horizontal deflections.

The deflection of all the pixel beams from a given zone is further modified by a prism that deflects the zones up or down and to one side in order to make all the beams in each zone converge to a point on a horizontal line across the face of the vertical deflection cell and final prism. This suggests that the opposite side of the faceted prism block (the input side) could be shaped with a given set of horizontal facets, one per zone, with the appropriate angle of tilt to accomplish that portion of the needed deflection of the pixel beams.

Figure 12:
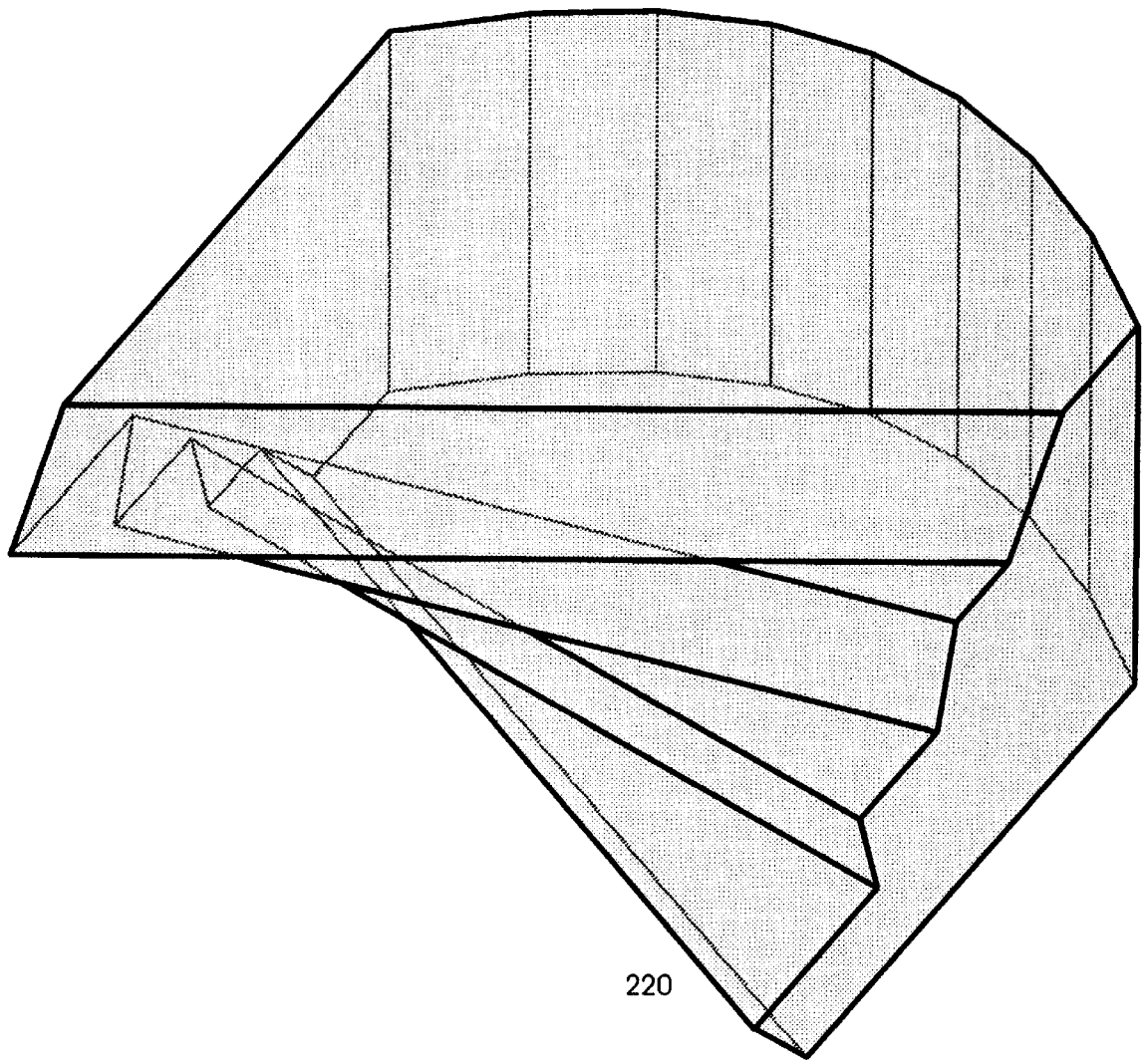
FIGS. 12, 13 and 14 are schematic representations of prisms for aiming modulated beams at a vertical deflector (array) in the embodiment of FIG. 5.
Figure 13:
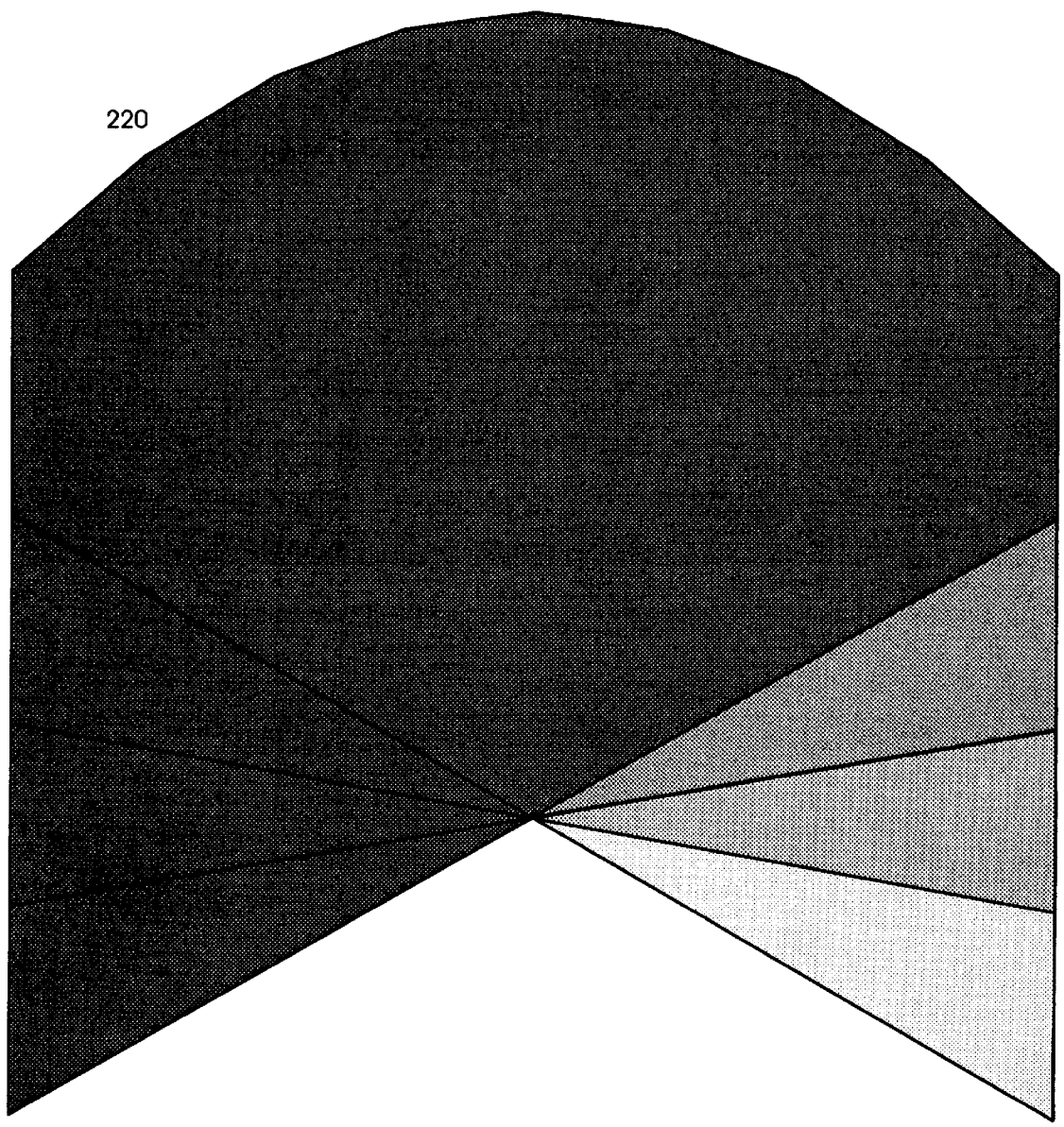
Figure 14:
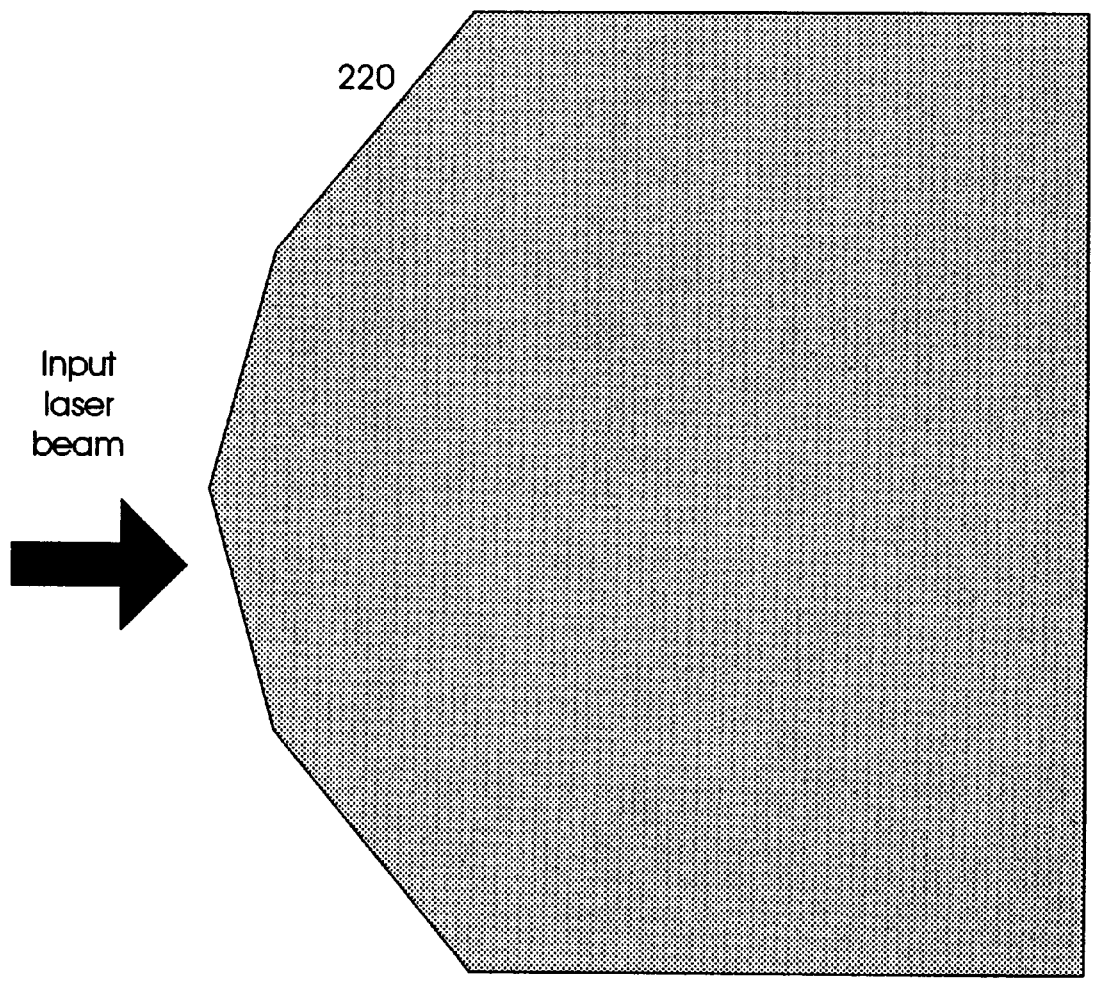

FIG. 12 shows such a faceted block 220 (viewed from the input side) for a projector with only thirty-two pixel beams arranged into four zones of eight pixels each. FIGS. 13 and 14 show the same prism from the top and side. FIG. 14 is actually a superposition of four slices through the prism block, one in the center of each zone facet. The appropriate angle for the facets can be calculated in a manner well understood in the art. The calculations for the array of pixel intensity modulators and zones as shown in FIG. 7 are shown in table I. It is assumed that there are twenty-six zones with a pixel range of from fourteen to thirty per zone and that the pixels are two millimeters apart horizontally and that the intensity modulators for the zones are spaced two millimeters apart vertically.

TABLE I

Pixel facet angles (horizontal deflection)

| i | δ | Degrees | (Deg. | Min. | Seconds) |
|---|---|---|---|---|---|
| −15 | −0.9063 | −3.02083 | (−3 | −1 | −15.0) |
| −14 | −0.8438 | −2.81250 | (−2 | −48 | −45.0) |
| −13 | −0.7813 | −2.60417 | (−2 | −36 | −15.0) |
| −12 | −0.7188 | −2.39583 | (−2 | −23 | −45.0) |
| −11 | −0.6563 | −2.18750 | (−2 | −11 | −15.0) |
| −10 | −0.5938 | −1.97917 | (−1 | −58 | −45.0) |
| −9 | −0.5313 | −1.77083 | (−1 | −46 | −15.0) |
| −8 | −0.4688 | −1.56250 | (−1 | −33 | −45.0) |
| −7 | −0.4063 | −1.35417 | (−1 | −21 | −15.0) |
| −6 | −0.3438 | −1.14583 | (−1 | −8 | −45.0) |
| −5 | −0.2813 | −0.93750 | (0 | −56 | −15.0) |
| −4 | −0.2188 | −0.72917 | (0 | −43 | −45.0) |
| −3 | −0.1563 | −0.52083 | (0 | −31 | −15.0) |
| −2 | −0.0938 | −0.31250 | (0 | −18 | −45.0) |
| −1 | −0.0313 | −0.10417 | (0 | −6 | −15.0) |
| 1 | 0.0313 | 0.10417 | (0 | 6 | 15.0) |
| 2 | 0.0938 | 0.31250 | (0 | 18 | 45.0) |
| 3 | 0.1563 | 0.52083 | (0 | 31 | 15.0) |
| 4 | 0.2188 | 0.72917 | (0 | 43 | 45.0) |
| 5 | 0.2813 | 0.93750 | (0 | 56 | 15.0) |
| 6 | 0.3438 | 1.14583 | (1 | 8 | 45.0) |
| 7 | 0.4063 | 1.35417 | (1 | 21 | 15.0) |
| 8 | 0.4688 | 1.56250 | (1 | 33 | 45.0) |
| 9 | 0.5313 | 1.77083 | (1 | 46 | 15.0) |
| 10 | 0.5938 | 1.97917 | (1 | 58 | 45.0) |
| 11 | 0.6563 | 2.18750 | (2 | 11 | 15.0) |
| 12 | 0.7188 | 2.39583 | (2 | 23 | 45.0) |
| 13 | 0.7813 | 2.60417 | (2 | 36 | 15.0) |
| 14 | 0.8438 | 2.81250 | (2 | 48 | 45.0) |
| 15 | 0.9063 | 3.02083 | (3 | 1 | 15.0) |

The total scan for such an arrangement is forty degrees wide with adjacent pixel spacing of 40/640 or 1/16th of a degree. The zone spacings vary from 14/16th of a degree (0.875 degrees) to 30/16th of a degree (1.875 degrees). The distance from the prism to the vertical deflectors is approximately 1.83 meters. The bundles (zones) of pixel beams must arrive at the vertical deflector spaced apart about twice their initial diameter, or about four millimeters. This implies that adjacent zones must be deflected up or down by the same 1/16th of a degree, and to one side by 1/8th of a degree. The angles in the table show how the facets are angled from an original flat, parallel-sided piece of plastic to form the desired prism. The table gives the pixel or zone number in the first column, the beam deflection angle in the second column (in decimal degrees), and the facet angle on the rest of the line. The facet angle is first given in decimal degrees, then in whole degrees, minutes, and decimal seconds.

The prisms (i.e., 60 and 61 of FIG. 5) do two jobs: deflect the beams vertically a small amount to align all the zones to the same line of the final screen image and deflect the beams in each zone to a different position on that line. But, it is preferable to implement these two functions with two different prisms: The first (the vertical deflection) is implemented by a single faceted prism located just in front of the vertical deflectors. This insures that all beams entering the deflectors travel in the same plane. The horizontal deflection is provided by a separate prism located after the vertical deflectors.

The vertical tilt needed for each zone is just the opposite of that used on the corresponding zone facet in the first prism because the job here is to exactly undo the tilt of the zone in the vertical direction caused by that first prism.

The second job of the horizontal deflection of each zone to the appropriate part of the scan line is accomplished by a multi-faceted prism following the vertical deflectors. The number of pixels in each zone is important here. In general, the horizontal deflection needed for each zone is simply half the number of pixels in that zone plus a number equal to all the pixels in all the zones between that zone and the center times the inter-pixel angle. If the number of pixels per zone varies as it does in FIG. 7, then the deflection of each zone from its neighbor will also vary. The angles for this embodiment is forty degrees divided by 640 which equals 0.0625 degrees or 3.75 minutes of arc. The facet angles to get these tilts are around two or three times as large as the beam deflections leading to manufacturing Tolerances of one minute of arc or one-half minute of arc in higher resolution cases.

With respect to the acoustic wave transducer (i.e., 20 of FIG. 1 and 58 of FIG. 5), piezoelectric crystals (e.g., quartz crystals) are often used to transform electric signals into acoustic ones and vice versa but at a frequency which is at least an order of magnitude less than the frequencies needed for the projector described herein. Clearly, the crystal plate has to be cut such that compression and expansion occurs, in response to electric field excursions, from the front to the back of the crystal plate.

Usually, the crystals are used at a frequency which is a small multiple of one of the fundamental modes of oscillation of that size crystal. But that is not necessary. When an electric field is applied in the correct direction, each unit cell of the crystal expands or contracts along the same axis by the same amount. The total expansion or contraction will, accordingly, simply be that amount times the number of unit cells in the thickness of the plate. The resulting acoustic energy is extracted from the crystal by coupling its front and back surfaces to the vertical deflectors on one side and to a sound absorber, a very massive support, or nothing on the other.

It is advantageous to have an exact match of the acoustic wave characteristic in the two media to avoid having acoustic energy bouncing back and forth within the crystal. If some mismatch does occur, resonances also occur for frequencies at which the thickness of the crystal is a multiple of a half wave length of the sound waves. At those frequencies the total acoustic wave energy in the crystal, and thus the amount transferred to the vertical deflectors, will be maximized. At a frequency half-way between adjacent resonances it will fall to a relative minimum. The ratio of the maximum to the minimum amplitude is a measure of the "quality factor" (Q) of the resonant system. If the crystal is quite thick, which may be necessary to get sufficiently large motions of the surfaces, then the resonant frequencies will be very close together. If the crystal is about as thick as the vertical deflector height (which is about the same as the diameter of a pixel beam), then since the speed of sound in a solid is about three times that in a liquid, the resonant frequencies of the crystal are about three-times more closely spaced than they would be in a flat-bottomed vertical deflector.

A judicious choice of crystal thickness would clearly permit the resonances of that crystal to be sufficiently dense that one would be close enough to each desired frequency for a screen image line's needed deflection, even though those frequencies are non-linearly spaced and the resonant frequencies are equally spaced.

With respect to the embodiment of FIG. 5, it is possible for the zones to overlap one another or to leave gaps between adjacent zones when the image appears on a screen. The horizontal positioning of the zones is actually perfect for only a single screen distance. But any possible gaps or overlaps are unnoticeable over a wide range of distances. The use of a faceted lens to realign the zones corrects for such horizontal zone placement inaccuracies if even shorter projector-to-screen distances are desired.

What is claimed is:

1. Image projection apparatus, said apparatus comprising a source of a single beam of coherent light, said apparatus including in succession along an optic axis, a means of dividing said beam into a bundle of unidirectional and parallel beams with a common diameter, a plurality greater than two of signal responsive intensity modulators (one for each of said beams), and a means for fanning out said beams as if all were diverging from a single point, said apparatus also including a vertical deflection means to send successive lines of modulated pixel image beams to appropriate places on a screen in a manner to form an image thereon.

2. Apparatus as in claim 1 wherein said vertical deflection means comprises a transparent compressible medium carrying an acoustic wave grating which will deflect the pixel beams by diffraction.

3. Apparatus as in claim 2 wherein said vertical deflection means has a geometry to define a standing acoustic wave grating.

4. Apparatus as in claim 2 wherein said vertical deflection means has a geometry to define a traveling acoustic wave grating.

5. Apparatus as in claim 2 wherein said vertical deflection means comprises a glass enclosure having first and second ends and defining first and second space-apart faces with said medium confined therebetween, said vertical deflection means including a piezo-electric crystal connected to said first end for causing said acoustic wave in response to input signals.

6. Apparatus as in claim 5 wherein said first and second ends are flat and parallel to one another.

7. Apparatus as in claim 5 wherein said first and second ends are flat but at a steep angle to the first end.

8. Apparatus as in claim 1 including a shield positioned between said vertical deflection means and said screen, said shield including an aperture offset from said optic axis for passing only a selected order of the diffracted beams to said screen, said screen being arranged in a position also offset from said optic axis for imaging beams passing through said aperture.

9. Apparatus as in claim 1 wherein said means for forming parallel pixel beams comprises an expanding and a collimating lens plus a beam aperture plate or plates.

10. Apparatus as in claim 9 wherein said parallel pixel beams are arranged side-by-side.

11. Apparatus as in claim 9 wherein said parallel pixel beams are arranged into "zone" groups, with the beams in each group side-by-side, and the groups arranged above and below one another.

12. Apparatus as in claim 1 wherein said means for fanning out the pixel beams as if diverging from a single point comprises a faceted prism following the array of pixel beam modulators.

13. Apparatus as in claim 11, wherein the means for fanning out the pixel beams as if diverging from a single point comprises a faceted prism simultaneously deflecting the beams from each zone to a different vertical angle and to a different place on the vertical deflection means, and directing the individual pixel beams within each zone to an appropriate horizontal angle, and a means at the vertical deflection means to redirect each zone bundle of pixel beams to the same horizontal line of the screen image and to the appropriate part of that line.

14. Apparatus as in claim 1 in which the means spreading said beam into a bundle of unidirectional and parallel beams includes a means for adjusting the diameters of all the pixel beams.

15. Apparatus as in claim 14 in which the means for adjusting the diameters of all the pixel beams is located in the vicinity of the vertical deflection means.

16. Apparatus as in claim 14 wherein the means of spreading said beam into a bundle of unidirectional and parallel beams with a common diameter includes an aperture plate pair for adjusting that common pixel beam diameter continuously.

17. Apparatus as in claim 15 wherein said apparatus comprises an aperture plate having a pattern of discrete apertures to set any of a number of pixel beam diameters in common for all those beams.

18. Image projection apparatus, said apparatus comprising a source of a coherent beam of light, including first a means of dividing said beam into a horizontal angular fan of beams, said apparatus including a signal-responsive means for modulating the individual beams of said fan, said apparatus also including a second means for deflecting said fan of beams in a vertical direction, said second means including a transparent compressible medium and voltage signal means communicating with said medium in a manner to induce an acoustic wave in said medium which wave will act as a diffraction grating to deflect the beams.

19. Apparatus as in claim 18 also including an aperture plate for forming said fan of beams into a horizontal row of pixels, each having a pre-set beam diameter.

20. Apparatus as in claim 1 wherein said signal responsive intensity modulators are Kerr cells.

* * * * *